US012580290B1

(12) United States Patent
Wrigley

(10) Patent No.: US 12,580,290 B1
(45) Date of Patent: Mar. 17, 2026

(54) CROSS-COUPLED DUAL-STUB WAVEGUIDE FILTER

(71) Applicant: Lockheed Martin Corporation, Bethesda, MD (US)

(72) Inventor: Jason Stewart Wrigley, Littleton, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 377 days.

(21) Appl. No.: 18/370,471

(22) Filed: Sep. 20, 2023

(51) Int. Cl.
*H01P 1/208* (2006.01)
*H01P 3/12* (2006.01)
*H01P 11/00* (2006.01)

(52) U.S. Cl.
CPC ................ *H01P 1/208* (2013.01); *H01P 3/12* (2013.01); *H01P 11/007* (2013.01)

(58) Field of Classification Search
CPC ........... H01P 1/208; H01P 3/12; H01P 11/007
USPC ................................................. 333/208–212
See application file for complete search history.

(56) References Cited

U.S. PATENT DOCUMENTS

2020/0028230 A1* 1/2020 Pham ........................ H01P 7/04
2024/0372238 A1* 11/2024 Griffin ...................... H01P 3/00

OTHER PUBLICATIONS

Comsol, "Waveguide Iris Bandpass Filter," Multiphysics 6.1, https://doc.comsol.com/5.6/doc/com.comsol.help.models.rf.waveguide_iris_filter/waveguide_iris_filter.html, 26 pages, downloaded Sep. 18, 2023.
Hardiati, Sri et al., "The Design Of Waveguide Band Pass Filter With Double-Irises Structure For Airport Surveillance Radar Applications On S-Band Frequency," AIP Conference Proceedings 1755, 8 pages, Jul. 21, 2016.
Wikipedia, "Waveguide Filter," 28 pages, Jan. 29, 2022.

* cited by examiner

*Primary Examiner* — Rakesh B Patel

(57) ABSTRACT

Provided herein are various enhancements for waveguide filters. A waveguide structure includes a series of iris-coupled resonant cavities forming a waveguide filter folded at a midpoint and having at least one cross-coupling established between non-adjacent resonant cavities. Resonant cavities at ends of the waveguide filter comprise bends coupled to ports arranged perpendicularly to a remainder of the resonant cavities. Stubs are included having inputs coupled at the ports and comprising short-circuited resonant cavities aligned parallel to the iris-coupled resonant cavities.

20 Claims, 5 Drawing Sheets

CROSS-COUPLED DUAL-STUB WAVEGUIDE FILTER

TECHNICAL BACKGROUND

Microwave radio frequency (RF) transmission and receiving systems are employed across a wide range of application areas, including satellite communications, terrestrial telecommunications, wireless data transmission, telemetry, surveillance, remote sensing and control, among other application areas. Often, RF transmit/receive circuitry is employed in concert with various waveguide-based feed components which couple to aperture antenna elements. Aperture antennas are a form of RF antenna used for directed transmission and reception of various RF signals, often employed in direct-radiated arrays or in reflector antenna feed systems.

In addition to straightforward RF conduits, waveguides be used to form various structures which can alter or direct the propagated signals based on frequency or wavelength, polarization, amplitude, phase, and other characteristics. Example waveguide-based components can include orthomode transducers (OMTs), polarizers, filters, couplers, hybrid couplers, and the like. Among the various types of waveguide filters, physical arrangements of conductive channels are often employed to filter or block unwanted signals while allowing wanted signals to pass. These configurations can include high-pass, low-pass, and bandpass filters, among others. Various levels of effectiveness can be achieved using selected types and variations of filter structures, with losses (e.g., insertion loss) often having to be balanced against filter effectiveness.

Existing waveguide-based filter structures include cavity resonator filters which have a single resonant cavity and iris-coupled filters which have a chain of resonant cavities coupled by iris apertures, where iris and cavity geometry can be selected to produce different filtering characteristics. Often, iris-coupled filters comprise bandpass filters which provide rejection of unwanted signals on either side of a passband (as represented in the frequency domain). Iris-coupled filters can include entry/exit stubs which provide transmission zero features. Iris-coupled filters can instead have cross-coupled configurations where non-adjacent cavities are coupled by a slot or aperture. However, each of these two configurations of iris-coupled filters still only provides two transmission zeros (or rejection nulls), which can limit the performance of such filters. Solutions to create filters with more desirable frequency responses (i.e., better rejection outside of the passband) can include making longer filters having many additional iris-coupled resonant cavities. However, this leads to large propagation losses, such as insertion losses, which reduce the effectiveness of such filter configurations.

SUMMARY

Discussed herein are various enhanced waveguide bandpass filter architectures and configurations, namely cross-coupled dual-stub (CCDS) waveguide filters. These provide compact filter packages with so-called "brick-wall" frequency response provided by a multiplicity of frequency-flexible transmission zeros. In the examples herein, a cross-coupled iris-style of waveguide filter is provided with stub elements and a folded configuration providing ports coupled perpendicularly to the filter elements. The CCDS configurations discussed herein offer approximately 30 dB in both rejection bands while trading minimal insertion loss. This is achieved by including four transmission zeros which can be individually configured to be on the high-side or low-side, allowing for customization of this architecture for many RF applications.

In a first example implementation, a waveguide structure includes a series of iris-coupled resonant cavities forming a waveguide filter folded at a midpoint and having at least one cross-coupling established between non-adjacent resonant cavities. Resonant cavities at ends of the waveguide filter comprise bends coupled to ports arranged perpendicularly to a remainder of the resonant cavities. Stubs are included having inputs coupled at the ports and comprising short-circuited resonant cavities aligned parallel to the iris-coupled resonant cavities.

In another example, a method of manufacturing includes forming a waveguide filter having a series of iris-coupled resonant cavities folded at a midpoint and having at least one cross-coupling established between non-adjacent resonant cavities. End resonant cavities of the waveguide filter are formed to comprise bends coupled to ports arranged perpendicularly to a remainder of the resonant cavities. The method also includes forming stubs having inputs coupled at the ports and comprising short-circuited resonant cavities aligned parallel to the iris-coupled resonant cavities.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Discussed herein are enhanced bandpass filter architectures and configurations which employ waveguide structures. One example structure includes a cross-coupled dual-stub (CCDS) waveguide filter which provides a compact filter package or physical envelope with so-called "brick-wall" frequency response. The CCDS filter includes cross-coupled iris-style of waveguide filter is provided with stub elements and a folded configuration providing ports coupled perpendicularly to the filter elements. The radio frequency (RF) performance of this CCDS filter is provided by a multiplicity of frequency-flexible transmission zeros, which include four zeros or "rejection nulls," three of which can be selected as either high-side or low-side with respect to a bandpass frequency range of the filter. When configured as an eight-section (eight-cavity) topology, the CCDS filters described herein can provide 30 dB brick wall rejection to either the high side of the passband or the low side of the passband depending on the application. Further sections or cavities could be added to achieve higher rejection levels.

Various terms are employed herein to describe the various structures and waveguides. The electric plane, or E-plane, is a plane defined by the direction of a transverse electric field in a waveguide. Often, this corresponds to a vertical axis along a waveguide. The magnetic plane, or H-plane, is a plane defined by the direction of the transverse magnetic field in a waveguide. Often, this corresponds to the horizontal axis along a waveguide. Discontinuities in a waveguide can include those in the E-plane (a discontinuity in vertical height), H-plane (a discontinuity in horizontal width), or combinations of the two.

Figure 1:
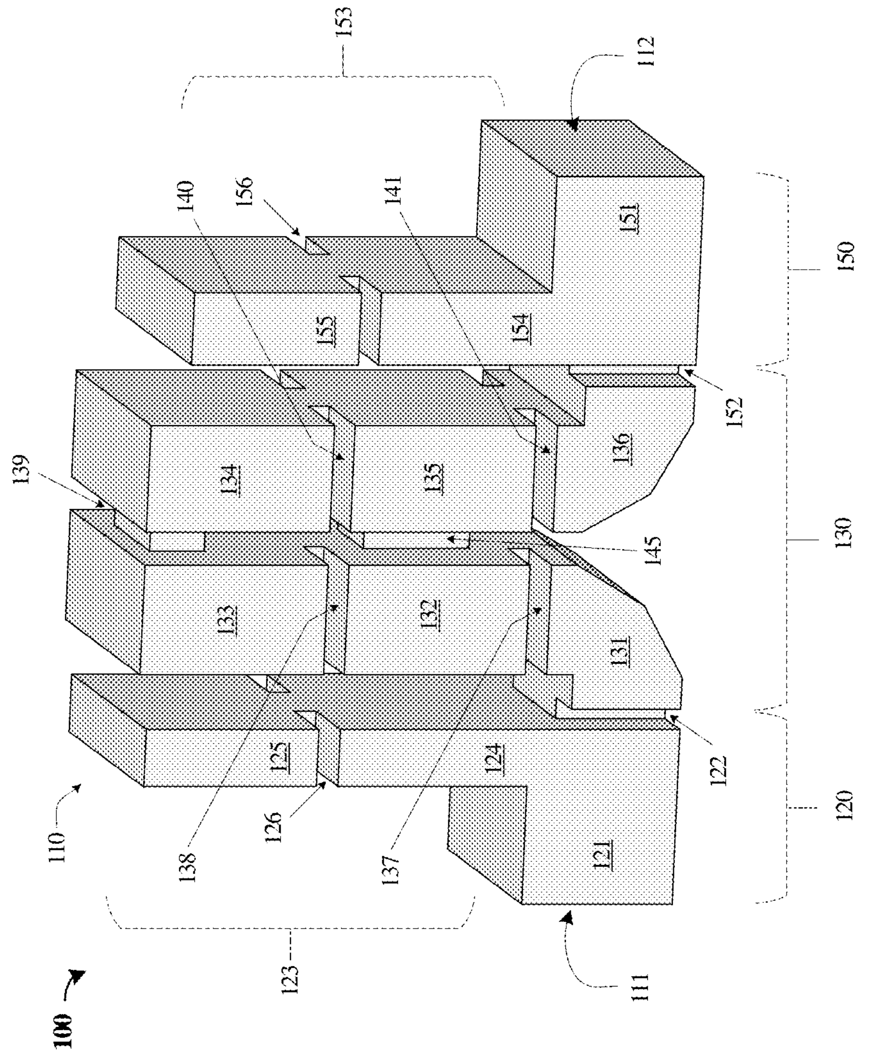
FIG. 1 illustrates an air-cavity view of a waveguide structure in an implementation.
Figure 3:
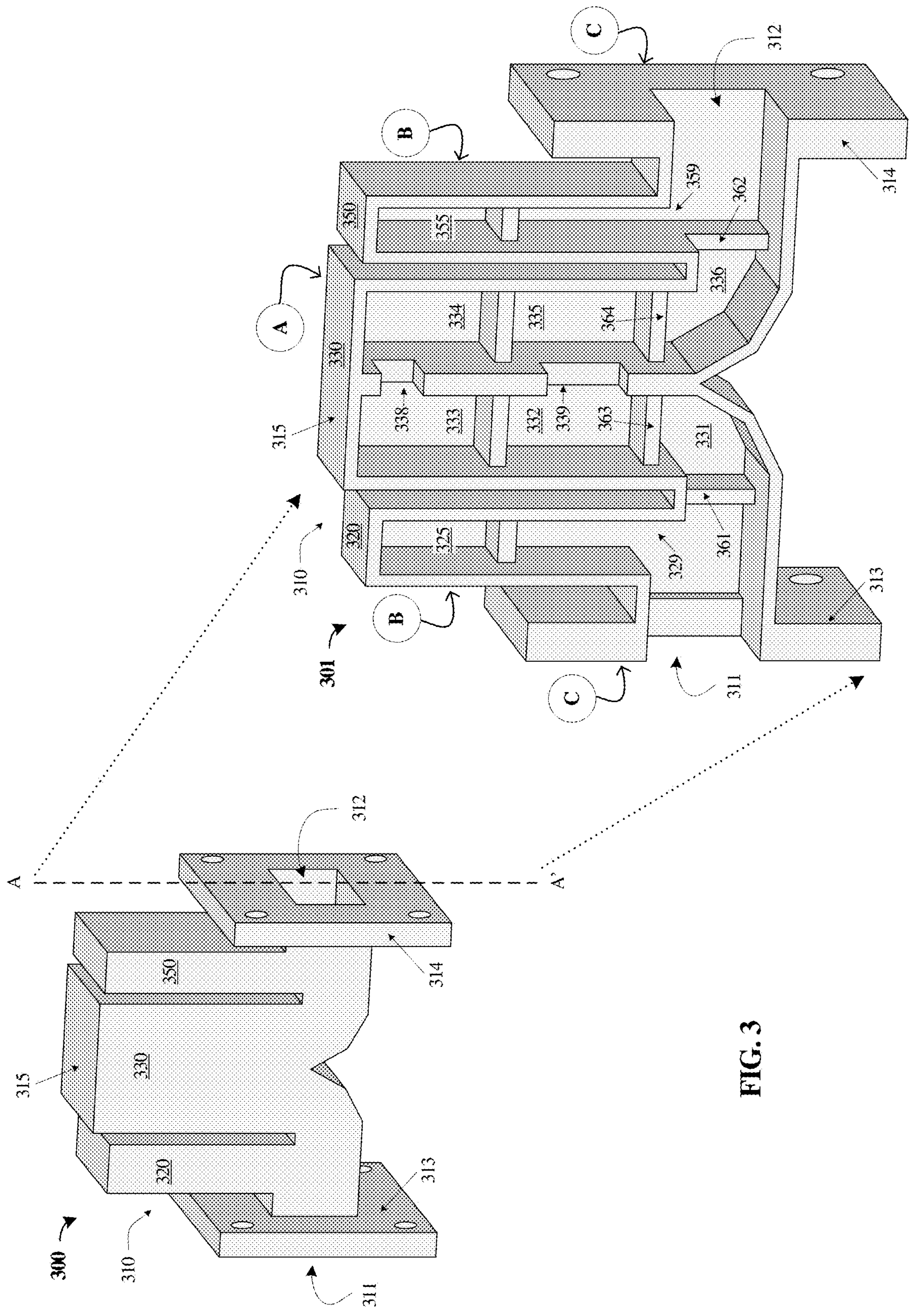
FIG. 3 illustrates a manufactured view of a waveguide structure in an implementation.

In a first example implementation, FIG. 1 is provided which illustrates air-cavity view 100 of waveguide structure 110. An air-cavity view comprises the volume or space internal to a waveguide or other RF structure, such that the view shows cavities, spaces, channels, conduits, or other features through which RF energy can propagate or resonate. In manufactured views, such as seen in FIG. 3, various material is provided to form a structure around the air-cavities, with conductive surfaces typically in contact with the air cavities. Variations on the manufactured implementation can be employed based on application, and thus the air-cavity view provides an illustration of the functional portions of a waveguide structure.

Turning now to the features illustrated in FIG. 1, view 100 shows waveguide structure 110 which includes section 120, section 130, and section 150. Section 120 comprises port 111, port cavity 121, iris 122, and stub 123 which includes entry cavity 124, resonant cavity 125, and iris 126. Section 130 comprises end resonant cavities 131 and 136, inner resonant cavities 132-135, irises 137-141, and cross-coupling aperture 145 (also referred to as window, slot, or iris). Section 150 comprises port 112, port cavity 151, iris 152, and stub 153 which includes entry cavity 154, resonant cavity 155, and iris 156.

Section 130 forms an iris-coupled waveguide filter having six (6) resonant cavities or chambers. Irises 122, 126, 137, 138, 139, 140, 141, 145, 152, and 156 comprise geometric discontinuities, or apertures, in a waveguide structure, and can take various configurations based on the desired RF behavior. In the example shown in FIG. 1, irises 122, 126, 137, 138, 140, 141, 152, and 156 establish discontinuities in the H-plane with reduced width edges parallel to the electric field (E field) which excites evanescent TE modes and forms a shunted inductor-equivalent (L) circuit configuration in a waveguide. Other examples can have discontinuities in the E-plane with reduced width edges parallel to the magnetic field (H field) which excites evanescent TM modes and forms a shunted capacitor-equivalent (C) circuit configuration in a waveguide. Yet other examples can include combinations of H/E plane discontinuities for parallel or series coupled LC circuit components, such as that shown for fold iris 139 and cross-coupling aperture 145. The combination of resonant cavities and irises in section 130 forms a filter configuration, namely a bandpass filter, which preferentially propagates RF energy having frequencies over a selected bandwidth. RF energy outside of the bandpass is attenuated to a particular degree.

At both ends of the iris-coupled waveguide filter (section 130) are two bent resonant cavities 131 and 136, each forming 90-degree bends. These bends orient input/output apertures of the iris-coupled waveguide filter perpendicular to remaining resonant cavities of the iris-coupled waveguide filter. Thus, end resonant cavities 131 and 136, along with remainder resonant cavities 132-135 form the iris-coupled waveguide filter. Furthermore, the iris-coupled waveguide filter has a folded configuration that includes resonant cavities 131-133 folded with respect to resonant cavities 134-136. Fold iris 139 is provided which provides for folding of the resonant cavities along the E-plane. This folding establishes a compact footprint for the iris-coupled waveguide filter, while still having in-line ports for waveguide structure 110 provided by end resonant cavities 131 and 136. Also, the folding along the E-plane enables a clean zero-current region split plane through the full iris-couple waveguide filter. Iris-coupled waveguide filter additionally includes a cross-coupling configuration among non-adjacent resonant cavities 132 and 135 via cross-coupling aperture 145. This cross-coupling configuration establishes a rejection null, also referred to as a transmission zero, for propagated RF energy in the iris-coupled waveguide filter. Properties of the cross-coupling configuration, such as the type and geometry of the iris selected for cross-coupling aperture 145, can be altered to select a frequency of the rejection null.

Coupled to end resonant cavities 131 and 136 are sections 120 and 150 comprising corresponding ports 111 and 112 and having short waveguide sections or vestibules 121 and 151 from which stubs 123 and 153 are formed. Stub 123 comprise resonant cavity 125 coupled to stub waveguide 124 by stub iris 126. Stub 153 comprises resonant cavity 155 coupled to stub waveguide 154 by stub iris 156. Stubs 123 and 153 establish rejection nulls or transmission zeros according to their corresponding geometry and arrangement. Stubs 123 and 153 establish a circuit element equivalent to an LC resonant circuit. The arrangement shown in FIG. 1 provides for a low-side null from stub 123 and a high-side null from stub 153 based in part on the lengths of resonant cavities 125 and 155, among other factors. Stub waveguides 124 and 154 are perpendicular to port waveguides 121 and 151, and thus stubs 123 and 153 are also perpendicular to ports 111 and 112, while being generally parallel to the folded iris-couple waveguide filter. Stubs 123 and 153 comprise short lengths of waveguide connected at one end to a corresponding portion of the iris-couple waveguide filter and short-circuited (i.e., closed) at the other end.

Thus, waveguide structure 110 advantageously provides for a compact and robust bandpass waveguide filter which combines two E-plane rejection nulls (via stubs 123 and 153) with two additional rejection nulls (via cross coupling aperture 145) in order to generate a multiplicity of rejection nulls, such as four (4). A flexibility to place these rejection nulls is provided such that various high-side or low-side nulls can be selected, such as 2 nulls on the low side and 2 nulls on the high side; 1 null on the low side and 3 nulls on the high side (depicted in FIG. 1); or 3 nulls on low side and 1 null on high side, among other configurations. In certain examples of this CCDS configuration, 30 dB rejection is produced from 21.4 GHz to 23.0 GHZ within a compact envelope. The CCDS configuration thus offers "brick wall" frequency response roll off with a desirable multiplicity of rejection nulls. Furthermore, the CCDS configuration can provide better than 18 dB return loss over tolerance and <0.9 ns group delay variation over the passband.

Figure 2:
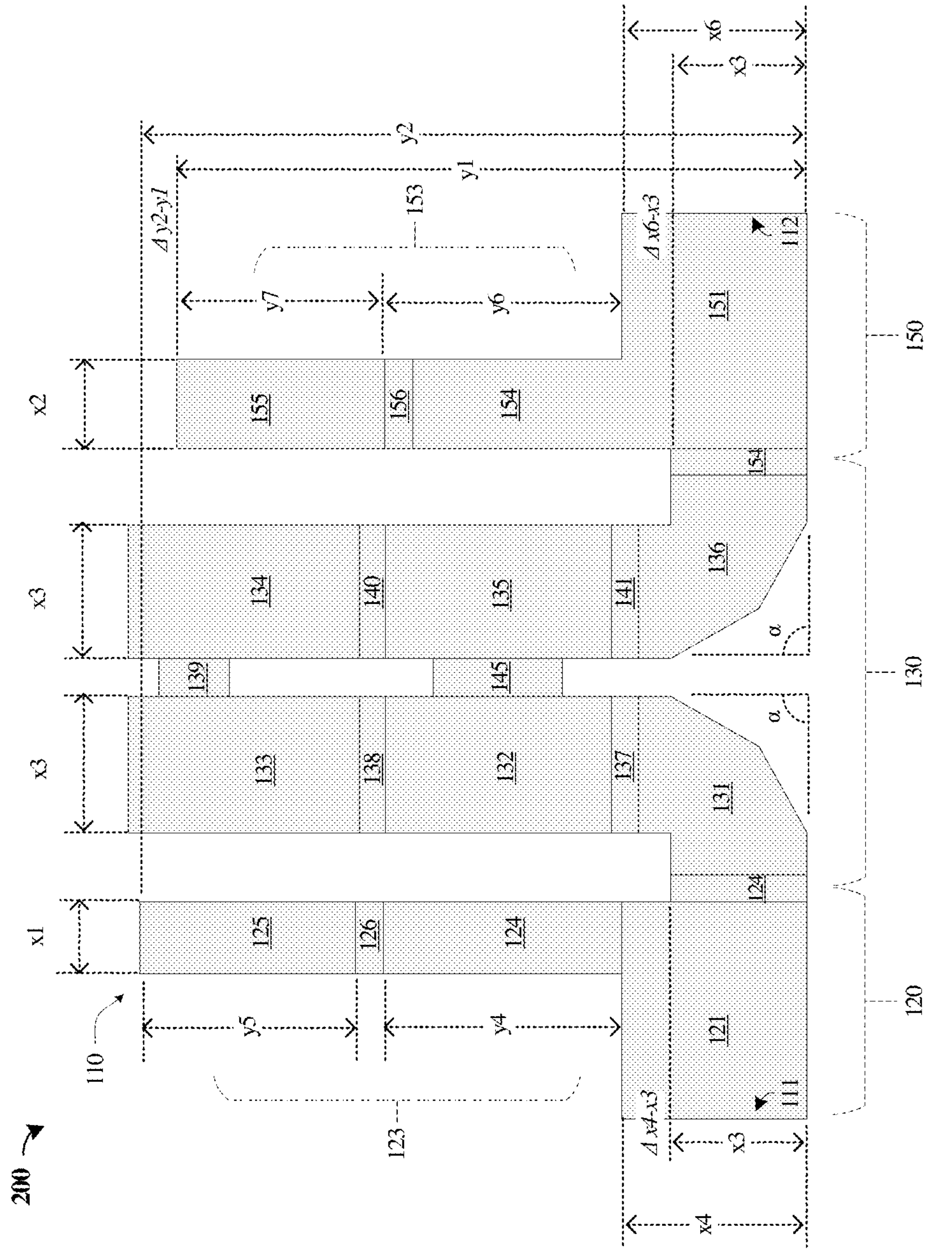
FIG. 2 illustrates an air-cavity view of a waveguide structure in an implementation.

FIG. 2 illustrates an air-cavity view 200 of a waveguide structure 110 in an implementation. Various dimensional features are highlighted in view 200, indicating corresponding sizes of the active elements of waveguide structure 110. Lengths of cavities or chambers are labeled with 'y' designators, and E-plane heights of cavities are labeled with 'x' designators. H-plane heights of the cavities are not featured in FIG. 2, but can are typically selected to be similar for waveguide structure 110, except for the irises which have a reduced H-plane height. Also, angle 'a' is shown as 90 degrees in this example, although variations are possible.

Turning first to section 120, port 111 has a height of x4 and cavity 131 has a height of x3, which is a shared height for cavities 131-136 of waveguide filter section 130. Thus, port 111 and cavity 131 can have a height differential of Δx4−x3. Stub section 123 has a height of x1, with a length of entry cavity 124 as y4 and of resonant cavity 125 as y5. The dimensions of stub 123 are used to select the cutoff frequency associated with stub 123. Section 150 has similar features as section 120, albeit with potentially different dimensional properties. Specifically, port 112 has a height of x6 and cavity 136 has a height of x3, which is a shared height for cavities 131-136 of waveguide filter section 130. Thus, port 112 and cavity 136 can have a height differential of Δx6−x3. Stub section 153 has a height of x2, with a length of entry cavity 154 as y6 and of resonant cavity 155 as y7. The dimensions of stub 153 are used to select the cutoff frequency associated with stub 153. Finally, a length difference between stub 123 and stub 153 can illustrate in a qualitative sense the frequencies selected for cutoff, namely Δy2−y1. In this example, stub 123 has a lower cutoff frequency than stub 153. An E-plane height (x3) of the end resonant cavities 131 and 136 is smaller than an E-plane height (x4, x6) of ports 111-113, with a step-down transition in heights positioned at stubs 123 and 153 between ports 111-112 and end resonant cavities 131 and 136.

FIG. 3 illustrates isometric manufactured view 300 and cross-sectional view 301 (at section A-A') of waveguide structure 310 in an implementation. Housing 315 is formed to establish the various air cavities discussed herein, and includes the ports, cavities, stubs, irises, apertures, and the like. Specifically, section 320 comprises a port/stub section for port 311 and section 350 comprises a port/stub section for port 312. Section 330 includes an iris-coupled waveguide filter in a folded configuration, which also includes bend cavities 331 and 336 to enable the folded filter configuration with inline ports 311-312.

Flanges 313 and 314 are included which can be employed to couple waveguide structure to other RF waveguide components, such as filters, polarizers, diplexers, antenna apertures, waveguide sections, power amplifiers, or other components. Although rectangular ports and bolted flanges are employed in this example, other shapes and configurations are possible. These other shapes or cavity structures can include rectangular, square, triangular, hexagonal, octagonal, irregular, or other shapes for one or more of the cavity walls.

Material thicknesses of the various features of housing 315 can be selected based on various RF performance factors, which can further depend on the material selected and manufacturing process selected. In some examples, the thickness can be selected to allow for successful manufacturing using a selected process, such as machining, stamped metal, additive manufacturing, laser powder bed fusion, selective laser sintering (SLS), powder bed fusion (PBF), casting, injection molding, electroform, electrical discharge machining (EDM), or other techniques. Any suitable conductive material including copper, aluminum, various metals or metallic alloys, or conductive carbon allotropes if associated conductive properties are sufficient. When a non-conductive material is employed to form housing 315, such as a polymer, dielectric materials, or insulating composite material, then conductive material or metallization can be deposited onto the RF-adjacent surfaces of waveguide structure 310, such as a conductive film.

Among the various techniques to manufacture waveguide structure 310, the following example techniques can be employed. Operations A, B, and C are shown in FIG. 3, which correspond to manufacturing steps discussed below, and can be performed in any suitable order. In operation A, waveguide filter section 330 can be formed having a series of iris-coupled resonant cavities 331-336 folded at midpoint iris 338 and having at least one cross-coupling iris 339 established between non-adjacent resonant cavities 332 and 335. End resonant cavities 331 and 336 of the waveguide filter are formed to comprise bends coupled to ports 311-312 arranged perpendicularly to a remainder of the resonant cavities (332-335). In operation B, sections 320 and 350 comprising stubs are formed having inputs 329 and 359 coupled at ports 311-312 and comprising short-circuited resonant cavities 325 and 355 aligned parallel to iris-coupled resonant cavities 332-335. Operation C includes forming flanges 313-314 at ports 311-312.

In some examples, a split-block design can be employed. In such examples, the waveguide filter, cavities, ports, flanges, bends, irises, cross-coupling, and stubs are formed as more than one workpiece having machined parts joined at an E-plane zero current region, which corresponds to section A-A' in FIG. 3. In other examples, a monolithic manufacturing process can be employed to produce a single workpiece. In this monolithic example, the waveguide filter, cavities, ports, flanges, bends, irises, cross-coupling, and stubs are formed as a single workpiece by manufacturing techniques selected among additive manufacturing and injection molding. When injection molding is employed, then conductive radio frequency surfaces can be produced by plating, metallization, coatings, or other techniques.

In some examples, section 330 includes the waveguide filter folded at midpoint iris 338 with a fold, or 180-degree bend, in the series of the iris-coupled resonant cavities at a zero-current region. Bends 331 and 336 comprise 90-degree bend resonant cavities with first irises 361-362 at ports 311-312 and second irises 363-364 at adjacent ones (332 and 335) of the remainder of the resonant cavities. Sections 330 and 350 comprising the stubs establish a first set of transmission zeroes for RF energy, with each stub corresponding to a transmission zero. Cross-coupling iris 339 is configured to establish a second set of transmission zeroes for the RF energy, typically two additional transmission zeroes. The first set of transmission zeroes and the second set of transmission zeros comprise at least four rejection nulls with a frequency configuration selected among high side rejection nulls and low side rejection nulls with respect to a bandpass frequency range. The configuration of the four rejection nulls is established based at least on sizing of corresponding cavities and irises.

Figure 4:
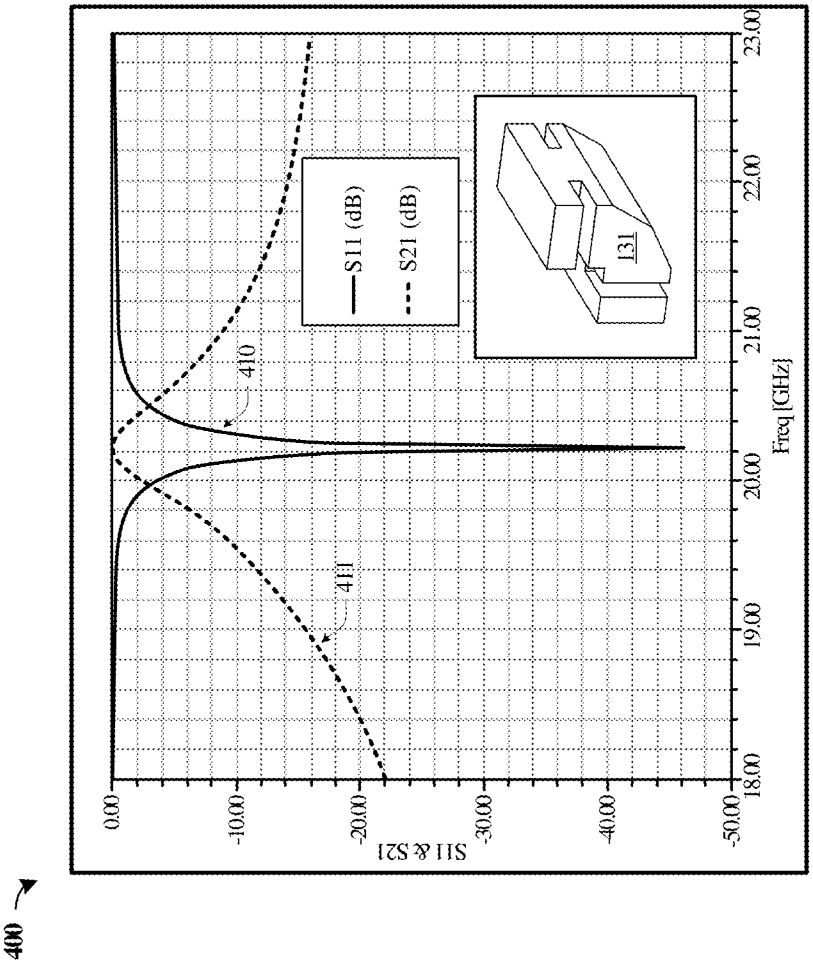
FIG. 4 illustrates performance characteristics for a portion of a waveguide structure in an implementation.

FIG. 4 illustrates performance characteristics for a portion of a waveguide structure in an implementation. FIG. 4 includes graph 400 illustrating example RF performance for bend cavity 131 of FIG. 1. Graph 400 includes curves 410 and 410 which provide RF performance of bend cavity 131, which corresponds to one resonant cavity composed of two irises. Similar performance can be expected for cavities 136, 331, and 336. This performance is shown over a frequency range of 18.00 to 23.00 GHz (horizontal axis). The vertical axis corresponds to decibels (dB). Curve 410 corresponds to S-parameter S11, and curve 411 corresponds to S-parameter S21.

S-parameters are measurements or simulations of performance of an RF system or waveguide structure. S11 corresponds to the input reflection coefficient with an output of the waveguide structure terminated by a matched load, and S21 corresponds to insertion loss for forward transmission (e.g., RF propagation from a first port to a second port). Typically, these are simulated or measured over a frequency sweep, such as 18.00 to 23.00 GHz in graph 400. As can be seen in graphs 410-411, bend cavity 131 has low reflection and low insertion loss at approximately 20.2 GHz.

Figure 5:
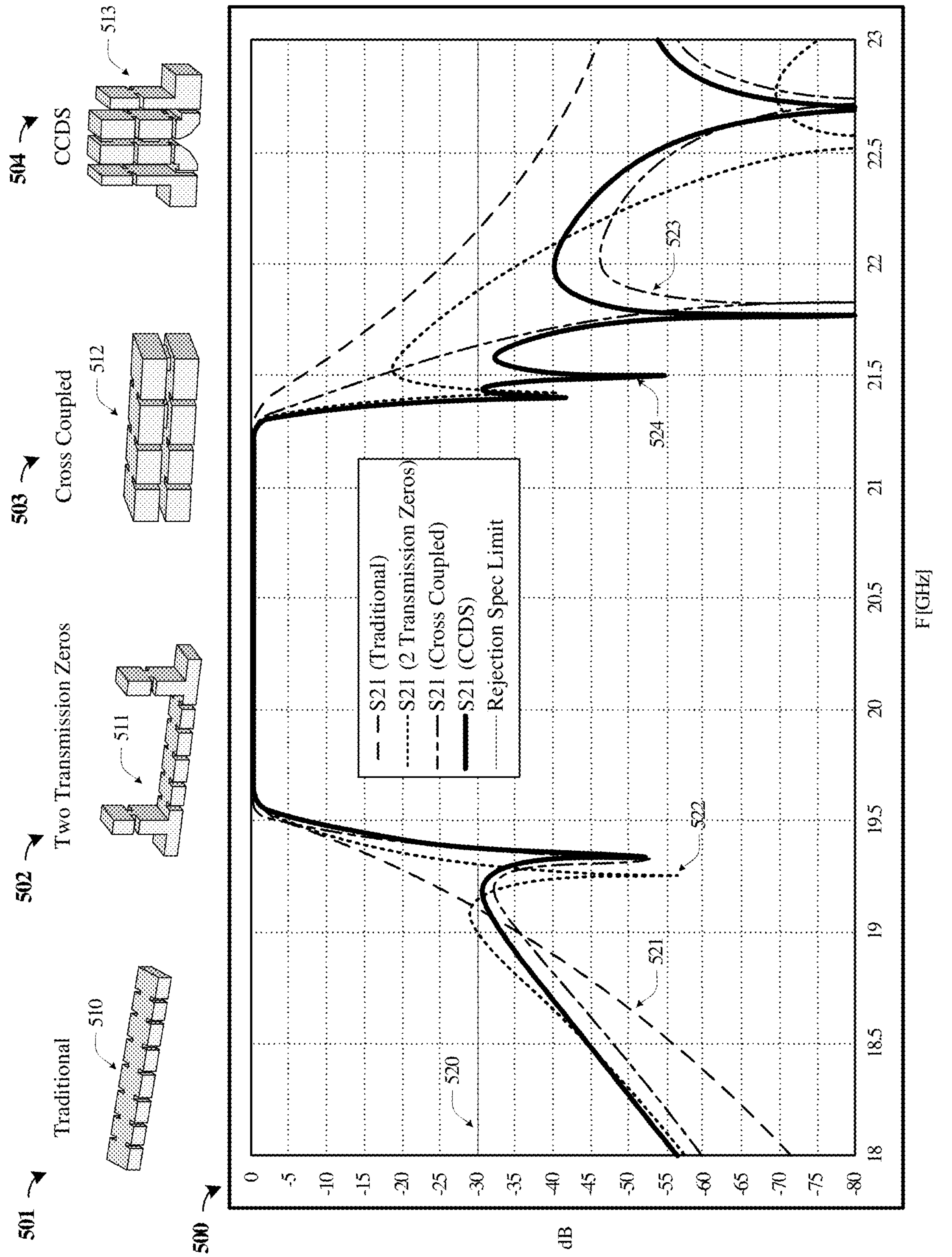
FIG. 5 illustrates performance characteristics for various waveguide structures compared to a waveguide structure formed according to the examples herein.

FIG. 5 illustrates performance characteristics for various waveguide structures compared to a CCDS type of waveguide structure formed according to the examples herein. FIG. 5 includes graph 500 which includes performance characteristics of four example waveguide structures over a frequency range of 18-23 GHz. Also, graph 500 includes rejection specification limit 520 which is a desired performance characteristic for attenuation (rejection) of propagated RF energy outside of a selected passband.

Curve 521 corresponds to traditional iris-coupled filter 510, which is in a planar 6-section bandpass configuration with ports on either longitudinal end. Curve 522 corresponds to a traditional iris-coupled filter 511 having two added stubs that produce two transmission zeros. Curve 523 corresponds to cross-coupled iris-coupled filter 512, which is similar to traditional iris-coupled filter 510 folded in half and a cross-coupling window added. Finally, curve 524 corresponds to enhanced CCDS waveguide structure 513, which is similar to that found in FIGS. 1-3. As can be seen from graph 500, CCDS waveguide structure 513 is the only filter to meet 30 dB rejection from 21.4 GHz to 23.0 GHZ and in a compact envelope.

Thus, CCDS waveguide structure 513 advantageously provides for a compact and robust bandpass waveguide filter which combines two E-plane rejection nulls (via stubs) with two additional rejection nulls (via cross coupling) in order to generate a multiplicity of rejection nulls, such as four (4). A flexibility to place these rejection nulls is provided such that various high-side or low-side nulls can be selected, such as 2 nulls on the low side and 2 nulls on the high side; 1 null on the low side and 3 nulls on the high side (depicted in FIG. 5); or 3 nulls on low side and 1 null on high side, among other configurations. In certain examples of this CCDS configuration, 30 dB rejection is produced from 21.4 GHz to 23.0 GHZ within a compact envelope. The CCDS configuration thus offers "brick wall" frequency response roll off with a desirable multiplicity of rejection nulls. Furthermore, the CCDS configuration can provide better than 18 dB return loss over tolerance and <0.9 ns group delay variation over the passband.

Frequency ranges selected for the various RF components, waveguide structures, filters, stubs, cavities, as well as the various configurations, systems, and arrangements herein can include various RF bands, such as microwave frequencies capable of transiting RF waveguide structures. Different frequency bands can be supported by similar architectures as shown herein, with associated geometry scaling to suit the selected frequency ranges. For instance, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHZ), mid band (1.7 GHZ to 2.5 GHZ), high band (24 to 100 GHZ (mmWave)) defined by the 3rd Generation Partnership Project (3GPP) and other organizations. Other example implementations might be configured to support a frequency range corresponding to the IEEE frequency bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A waveguide structure, comprising:

a series of iris-coupled resonant cavities forming a waveguide filter folded at a midpoint and having at least one cross-coupling established between non-adjacent resonant cavities, wherein end resonant cavities of the waveguide filter comprise bends coupled to ports arranged perpendicularly to a remainder of the resonant cavities; and stubs having inputs coupled at the ports and comprising short-circuited resonant cavities aligned parallel to the iris-coupled resonant cavities.

2. The waveguide structure of claim 1, wherein the waveguide filter folded at the midpoint comprises an electric field plane (E-plane) folded arrangement having a midpoint iris coupling two adjacent cavities of the waveguide filter.

3. The waveguide structure of claim 1, wherein the waveguide filter folded at the midpoint comprises a fold in the series of the iris-coupled resonant cavities at a zero-current region.

4. The waveguide structure of claim 1, wherein the bends comprise 90-degree bend resonant cavities with first irises at the ports and second irises at adjacent ones of the remainder of the resonant cavities.

5. The waveguide structure of claim 1, wherein the stubs establish a first set of transmission zeroes for radio frequency energy.

6. The waveguide structure of claim 5, wherein the cross-coupling is configured to establish a second set of transmission zeroes for the radio frequency energy.

7. The waveguide structure of claim 6, wherein the first set of transmission zeroes and the second set of transmission zeros comprise at least four rejection nulls with a frequency configuration selected among high side rejection nulls and low side rejection nulls with respect to a bandpass frequency range.

8. The waveguide structure of claim 7, wherein the configuration of the at least four rejection nulls is established based at least on sizing of corresponding cavities and irises.

9. The waveguide structure of claim 1, wherein the irises of the iris-coupled resonant cavities comprise H plane discontinuities.

10. The waveguide structure of claim 1, wherein an E-plane height of the end resonant cavities is smaller than an E-plane height of the ports, with a step-down transition in heights positioned at the stubs between the ports and the end resonant cavities.

11. A method, comprising:

forming a waveguide filter having a series of iris-coupled resonant cavities folded at a midpoint and having at least one cross-coupling established between non-adjacent resonant cavities, wherein end resonant cavities of the waveguide filter are formed to comprise bends coupled to ports arranged perpendicularly to a remainder of the resonant cavities; and forming stubs having inputs coupled at the ports and comprising short-circuited resonant cavities aligned parallel to the iris-coupled resonant cavities.

12. The method of claim 11, wherein the waveguide filter folded at the midpoint comprises an electric field plane (E-plane) folded arrangement having a midpoint iris coupling two adjacent cavities of the waveguide filter.

13. The method of claim 11, wherein the waveguide filter folded at the midpoint comprises a fold in the series of the iris-coupled resonant cavities at a zero-current region.

14. The method of claim 11, wherein the bends comprise 90-degree bend resonant cavities with first irises at the ports and second irises at adjacent ones of the remainder of the resonant cavities.

15. The method of claim 11, wherein the stubs establish a first set of transmission zeroes for radio frequency energy; and wherein the cross-coupling is configured to establish a second set of transmission zeroes for the radio frequency energy.

16. The method of claim 15, wherein the first set of transmission zeroes and the second set of transmission zeros comprise at least four rejection nulls with a frequency configuration selected among high side rejection nulls and low side rejection nulls with respect to a bandpass frequency range.

17. The method of claim 16, wherein the configuration of the at least four rejection nulls is established based at least on sizing of corresponding cavities and irises.

18. The method of claim 11, wherein an E-plane height of the end resonant cavities is smaller than an E-plane height of the ports, with a step-down transition in heights positioned at the stubs between the ports and the end resonant cavities.

19. The method of claim 11, comprising:

forming the waveguide filter, the ports, the bends, and the stubs as more than one workpiece having machined parts joined at an E plane zero current region.

20. The method of claim 11, comprising:

forming the waveguide filter, the ports, the bends, and the stubs as a single workpiece by manufacturing techniques selected among additive manufacturing and injection molding having conductive radio frequency surfaces.

* * * * *